United States Patent
Arai

(10) Patent No.: US 7,255,501 B2
(45) Date of Patent: Aug. 14, 2007

(54) PRINTING DEVICE

(75) Inventor: Takashi Arai, Fukushima-ken (JP)

(73) Assignee: Oki Data Corporation, Tokyo (JP)

( * ) Notice: Subject to any disclaimer, the term of this patent is extended or adjusted under 35 U.S.C. 154(b) by 182 days.

(21) Appl. No.: 11/052,048

(22) Filed: Feb. 8, 2005

(65) Prior Publication Data

US 2005/0180792 A1    Aug. 18, 2005

(30) Foreign Application Priority Data

Feb. 17, 2004  (JP) .............................. 2004-040209

(51) Int. Cl.
*B41J 3/42*    (2006.01)

(52) U.S. Cl. .................. 400/74; 400/76; 358/1.16; 399/13

(58) Field of Classification Search ............ 400/70–76, 400/82; 358/1.15–1.16; 399/8–13, 24, 25
See application file for complete search history.

(56) References Cited

U.S. PATENT DOCUMENTS

| | | | | |
|---|---|---|---|---|
| 5,924,802 A | * | 7/1999 | Sakurai | 400/61 |
| 6,625,402 B2 | * | 9/2003 | Takemoto | 399/8 |
| 7,031,012 B1 | * | 4/2006 | Serizawa | 358/1.16 |

\* cited by examiner

*Primary Examiner*—Minh Chau
(74) *Attorney, Agent, or Firm*—Takeuchi & Kubotera, LLP

(57) ABSTRACT

A printing device includes a function adding unit detachable to the printing device; a display unit for displaying an error message; a detection unit for detecting that the function adding unit is attached to the printing device; and a device control unit for controlling the display unit to display the error message when the function adding unit is not attached to the printing device.

15 Claims, 8 Drawing Sheets

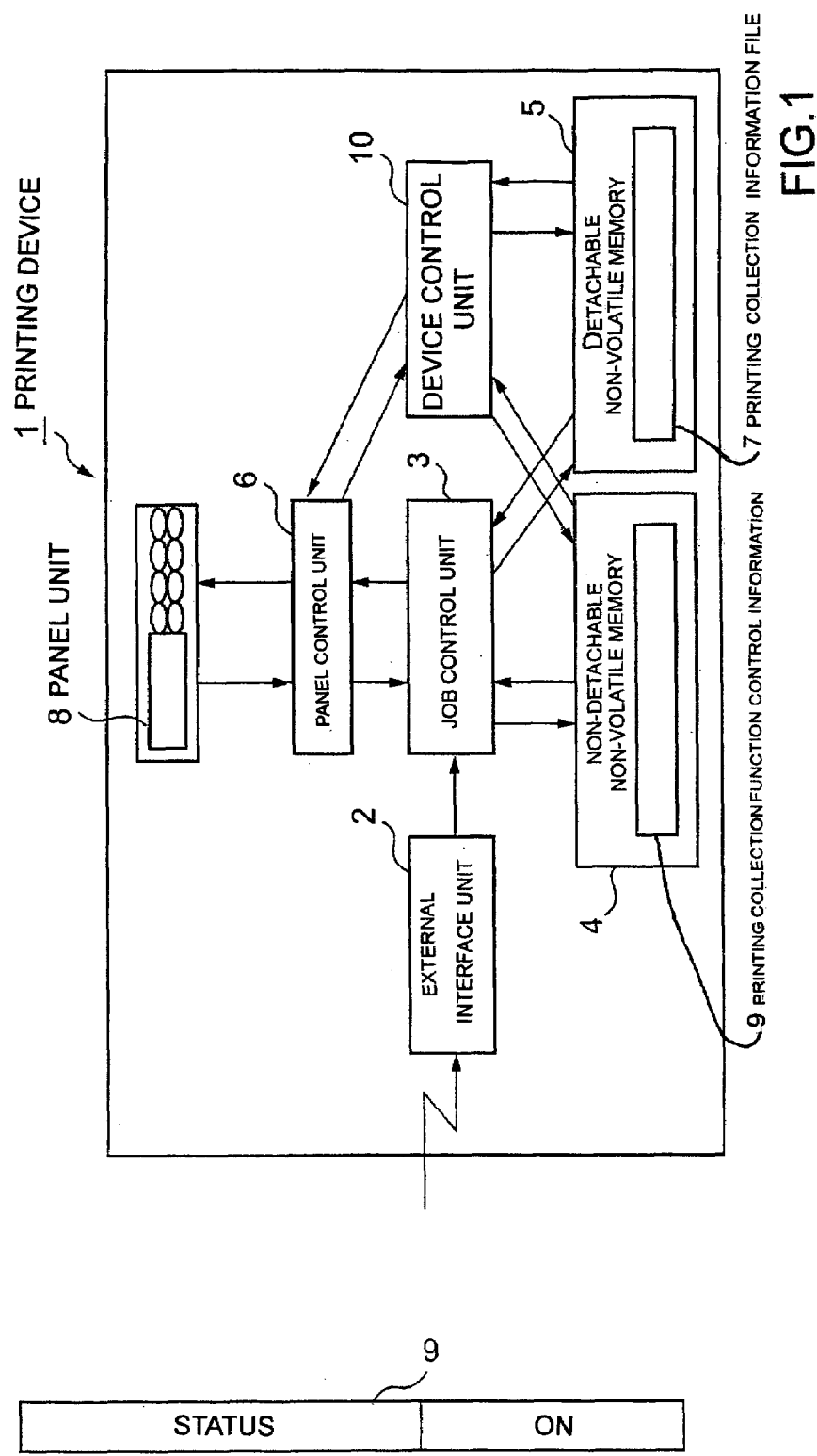

| INFORMATION | COUNT VALUE | |
|---|---|---|
| SHEET CONSUMPTION INFORMATION | 10000 | 7 |
| SHEET CONSUMPTION INFORMATION (CYAN) | 200 | |
| SHEET CONSUMPTION INFORMATION (MAGENTA) | 500 | |
| SHEET CONSUMPTION INFORMATION (YELLOW) | 800 | |
| SHEET CONSUMPTION INFORMATION (BLACK) | 1500 | |
| DRUM CONSUMPTION INFORMATION (CYAN) | 30 | |
| DRUM CONSUMPTION INFORMATION (MAGENTA) | 70 | |
| DRUM CONSUMPTION INFORMATION (YELLOW) | 10 | |
| DRUM CONSUMPTION INFORMATION (BLACK) | 1000 | |
| STAPLE CONSUMPTION INFORMATION | 5 | |

FIG.3

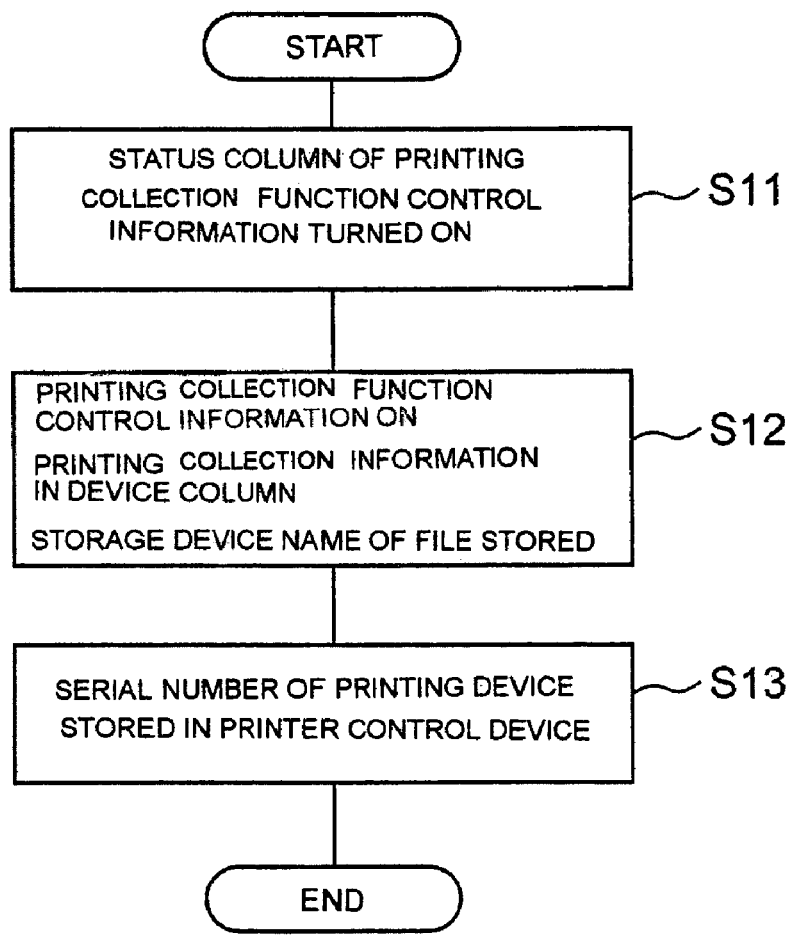

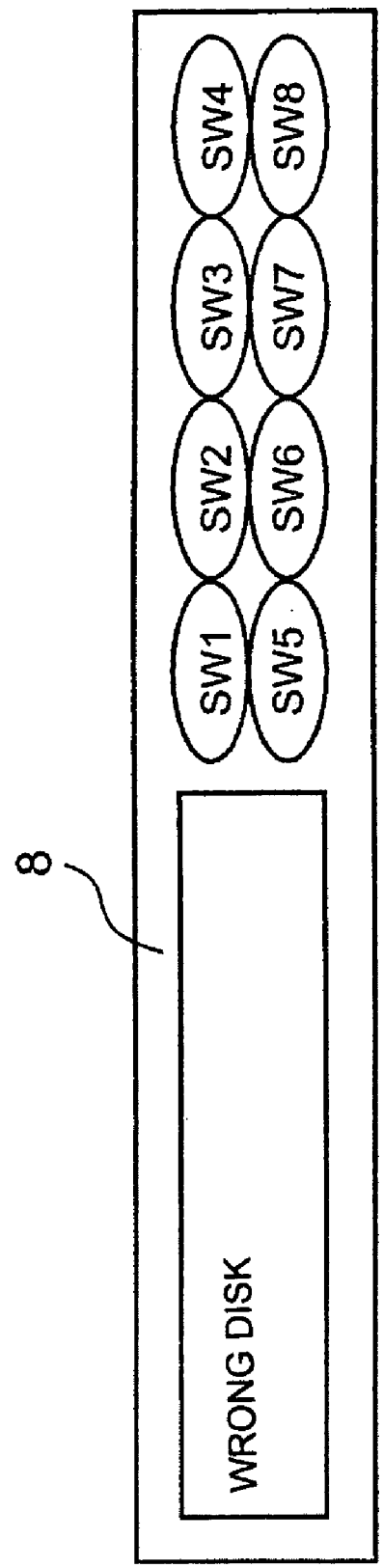

PRINTING DEVICE

BACKGROUND OF THE INVENTION AND RELATED ART STATEMENT

The present invention relates to a printing device having a function of storing device information.

A conventional printing device may be provided with a detachable non-volatile memory, and a printing collection information file is created in the detachable non-volatile memory. The printing collection information file includes a file that a printing device collects consumption information upon each printing. In such a printing device, when the printing collection function is turned on for collecting the consumption information (device information) upon each printing, a count or information of the device information in the printing collection information file is updated. The update is performed every time when the printing device prints or performs various operations, thereby collecting the device information.

There may be a case in which the printing device is turned off while the printing collection function is turned on, and the detachable non-volatile memory is removed from the printing device while the printing device is turned off. In this case, when the printing device is turned on again, it is recognized that the printing device does not have the printing collection information file. Accordingly, the printing device prints without performing the printing collection function, i.e., without collecting the device information.

A conventional printing device may be provided with a detachable auxiliary functional unit (option functional unit). In such a printing device, when the printing device is turned on or re-set, it is determined that the option functional unit is attached to the printing device. When the option functional unit is attached to the printing device, a corresponding control program is designated from a program memory according to a type of option functional unit, so that the option functional unit becomes functional. When the option functional unit is not attached to the printing device, the printing device completes a main operation as is (for example, refer to Japanese Patent Publication (Kokai) No. 05-345457).

There may be a case in which the printing device is turned off while the printing collection function is turned on, and the detachable non-volatile memory is removed from the printing device while the printing device is turned off. In this case, when the printing device is turned on again, it is recognized that the printing device does not have the printing collection information file. Accordingly, the printing device prints without performing the printing collection function, i.e., without collecting the device information.

When the printing device prints without collecting the device information, it is difficult to accurately collect the device information. When a charging operation is performed based on the printing collection, it is difficult to accurately perform the charging operation. Further, it is difficult to recognize the option functional unit attached in advance by a user.

In the printing device disclosed in Japanese Patent Publication (Kokai) No. 05-345457, when the printing device is turned on or re-set, it is determined that the option functional unit is attached to the printing device. When it is determined that the option functional unit is not attached to the printing device, a result is not notified externally.

In view of the problems described above, an object of the present invention is to provide a printing device capable of accurately collecting device information. When a charging operation is performed based on the printing collection, it is possible to accurately perform the charging operation. Further, it is possible to recognize an option functional unit attached in advance by a user.

Further objects and advantages of the invention will be apparent from the following description of the invention.

SUMMARY OF THE INVENTION

In order to attain the objects described above, according to the present invention, a printing device includes a function adding unit detachable to the printing device; a display unit for displaying an error message; a detection unit for detecting that the function adding unit is attached to the printing device; and a device control unit for controlling the display unit to display the error message when the function adding unit is not attached to the printing device.

According to the present invention, the function adding unit may include a memory unit for storing device information or an option functional unit for adding a function to the printing device.

According to the present invention, the detection unit detects that the function adding unit is attached to the printing device when the printing device has information indicating that the function adding unit is attached to the printing device. Further, the detection unit detects that the function adding unit is attached to the printing device when the printing device has information indicating that the printing device is in a mode of storing the device information.

According to the present invention, the memory unit stores identification information of a printing device to which the memory unit is to be attached. The memory unit may include a judging unit for judging that the identification information matches to identification information stored in the printing device provided with the memory unit after the detection unit detects that the memory unit is attached to the printing device.

According to the present invention, the device control unit controls the printing device not to print when the display unit displays the error message. The device information includes charging information and consumption information of a supply of the printing device. The supply includes a developing material and a developing unit. An upper device sends a command to set the mode, or an operating unit in the printing device is operated to set the mode. The identification information includes a specific number of the printing device and a specific number of the memory unit.

BRIEF DESCRIPTION OF THE DRAWINGS

FIG. 1 is a block diagram showing a structure of a printing device according to a first embodiment of the present invention;

FIG. 2 is a schematic view showing printing collection function control information according to the first embodiment of the present invention;

FIG. 3 is a schematic view showing a printing collection information file according to the first embodiment of the present invention;

FIG. 6 is a block diagram showing a structure of a printing device according to a second embodiment of the present invention;

FIG. 8 is a schematic view showing printing collection function control information according to the second embodiment of the present invention;

FIG. 9 is a flow chart showing a process of initializing a printing collection function according to the second embodiment of the present invention;

FIG. 11 is a schematic view showing a panel unit according to the second embodiment of the present invention.

DETAILED DESCRIPTION OF PREFERRED EMBODIMENTS

Figure 4:
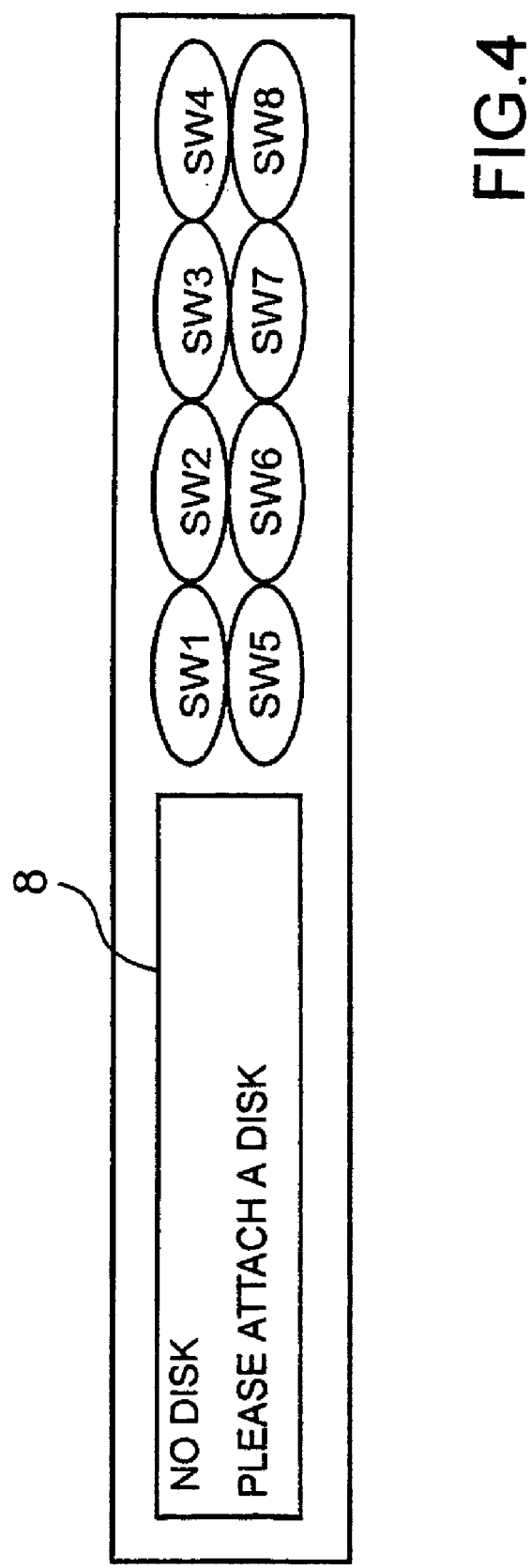
FIG. 4 is a schematic view showing a panel unit according to the first embodiment of the present invention.

Hereunder, embodiments of the present invention will be explained with reference to the accompanying drawings. FIG. 1 is a block diagram showing a structure of a printing device according to a first embodiment of the present invention. FIG. 2 is a schematic view showing printing collection function control information according to the first embodiment of the present invention. FIG. 3 is a schematic view showing a printing collection information file according to the first embodiment of the present invention. FIG. 4 is a schematic view showing a panel unit according to the first embodiment of the present invention;

As shown in FIG. 1, a printing device 1 is connected to an upper device (not shown) such as a personal computer connected to a network, and has an external interface unit 2 for receiving a job from the upper device. The external interface unit 2 is connected to a job control unit 3, so that the job received from the upper device is sent to the job control unit 3. The job control unit 3 is connected to a non-detachable non-volatile memory 4; a detachable non-volatile memory 5 (for example, hard disk) for storing consumption information or device information upon every printing; a panel control unit 6; and a device control unit or a device information control unit 10. The job control unit 3 controls the printing device 1 as a whole to properly perform printing collection function.

The job control unit 3 stores printing collection function control information 9 in the non-detachable non-volatile memory 4. The printing collection function control information 9 has a structure shown in FIG. 2. When a collection function is turned on, "1" is stored as a status. When the collection function is not turned on, "0" is stored as a status.

An operator may input a command to perform the collection function (on) through a menu function on a panel unit 8 or a display unit. Alternatively, the external interface unit 2 may receive a collection function turn-on command from the upper device. Accordingly, the job control unit 3 stores "1" indicating "on" as a status of the printing collection function control information 9 in the non-detachable non-volatile memory 4.

The job control unit 3 creates a printing collection information file 7 in the detachable non-volatile memory 5. The printing collection information file 7 has a structure shown in FIG. 3, and collects the consumption information upon each printing. After the status of the printing collection function control information 9 is set to be "1" indicating "on", every time when the printing device 1 prints or performs other operation, the job control unit 3 updates a count value or information of corresponding device information in the printing collection information file 7, thereby performing printing collection.

From the count value in the printing collection information file 7, the printing device 1 can determine the number of consumed sheets; an amount of consumed toner for each of black, magenta, cyan, and yellow in a case of a device capable of printing color; an amount of wear of an exposure drum for each of black, magenta, cyan, and yellow; and an amount of consumed staples. Incidentally, the device information includes consumption information of a developing material (toner), consumption information of a developing unit of the device (exposure drum), and charging information.

When the printing device 1 is initialized, the job control unit 3 is connected to the device control unit 10 to check a relation between an operation of the printing collection function and the device. The device control unit 10 is also connected to the non-detachable non-volatile memory 4, the detachable non-volatile memory 5, and the panel control unit 6.

The device control unit 10 receives a signal indicating whether the detachable non-volatile memory 5 is attached to the printing device 1. Further, the device control unit 10 checks whether the status of the printing collection function control information 9 is "1" or "0". Accordingly, the device control unit 10 can determine whether the detachable non-volatile memory 5 is attached to the printing device 1, or the detachable non-volatile memory 5 stores the printing collection information file 7.

When the device control unit 10 determines that the detachable non-volatile memory 5 is not attached to the printing device 1 while the printing collection function is turned on, the device control unit 10 requests the panel control unit 6 to externally display error information indicating the device is in an abnormal condition. Accordingly, as shown in FIG. 4, the panel control unit 6 displays the error information on the panel unit 8 indicating that the detachable non-volatile memory 5 is not attached. The device control unit 10 also requests a control unit (not shown) controlling the printing device 1 as a whole to stop driving the device, thereby stopping the printing device 10. The panel control unit 6 has a function of displaying a printer status received from the job control unit 3 and data received from the device control unit 10 on the panel unit 8.

A process of initializing the printing collection function of the printing device 1 will be explained next. The process of initializing the printing collection function starts when an operator inputs a command to turn on the printing collection function with the menu function of the panel unit 8, or the external interface unit 2 receives the collection function turn-on command from the upper device (not shown) so that the device is set in a performing mode. The job control unit 3 turns "on" the status of the printing collection function control information 9 in the non-detachable non-volatile memory 4. The job control unit 3 also creates the printing collection information file 7 in the detachable non-volatile memory 5.

Figure 5:
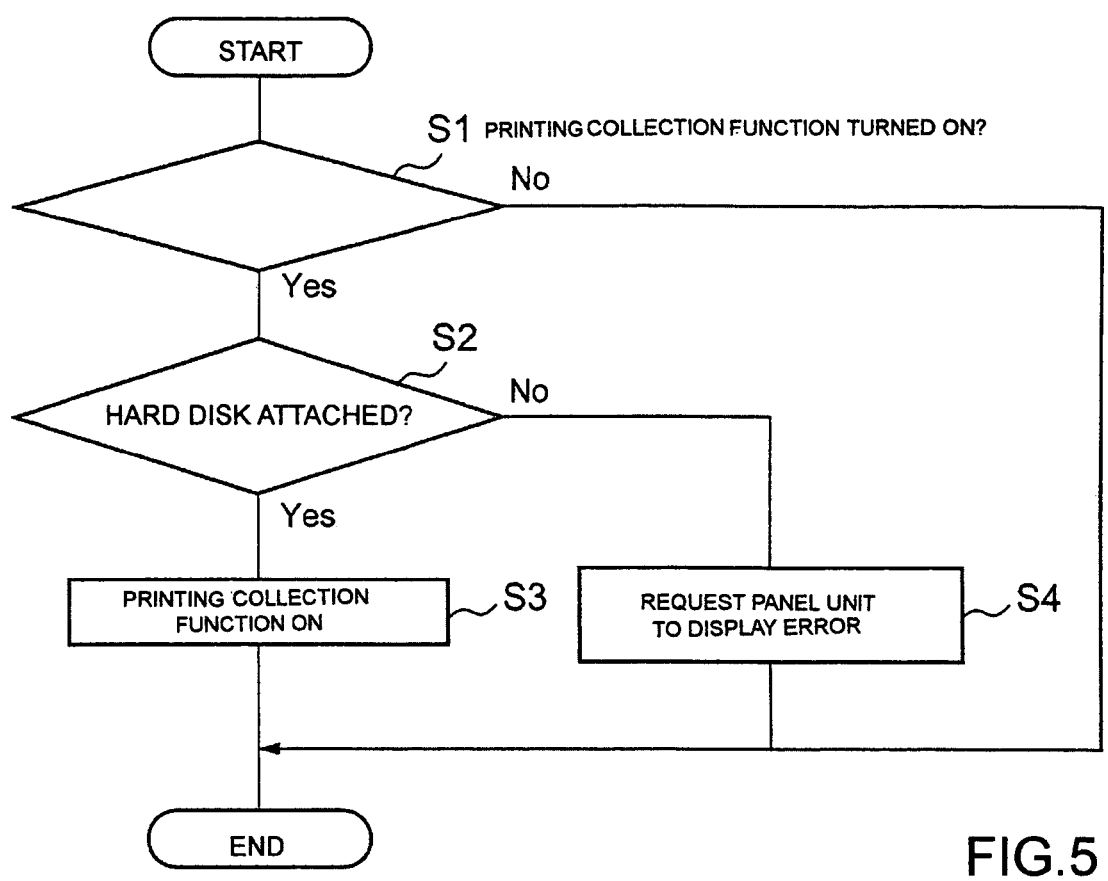
FIG. 5 is a flow chart showing a process of initializing a device control unit according to the first embodiment of the present invention.

The process of initializing the printing collection function starts after the printing device 1 is turned on. That is, when the printing collection function is turned on while the detachable non-volatile memory 5 is not attached, it is determined that the detachable non-volatile memory 5 is not attached and a function is set to display an error and not to start the printing device 1. In order to set the function, the device control unit 10 is initialized. A process of initializing the device control unit 10 will be explained with reference to FIGS. 1 to 5. FIG. 5 is a flow chart showing the process of initializing the device control unit according to the first embodiment of the present invention.

In step S1, the device control unit 10 refers the printing collection function control information 9 in the non-detachable non-volatile memory 4 to determine whether the printing collection function is turned on. When the status is "1" indicating that the printing collection function is turned on, the process proceeds to step S2. When it is not the case ("0" indicating that the printing collection function is not turned on), the process stops.

In step S2, the device control unit 10 determines whether the detachable non-volatile memory 5 (hard disk) is attached to the printing device 1. Then, the device control unit 10 determines whether the detachable non-volatile memory 5 stores the printing collection information file 7. The device control unit 10 receives a signal indicating whether the detachable non-volatile memory 5 (hard disk) is attached to the printing device 1. Further, the device control unit 10 determines whether the detachable non-volatile memory 5 stores the printing collection information file 7. Accordingly, the device control unit 10 can determine whether the detachable non-volatile memory 5 is attached to the printing device 1, and the detachable non-volatile memory 5 stores the printing collection information file 7.

In step 2, when the device control unit 10 determines that the detachable non-volatile memory 5 is attached to the printing device 1, and the detachable non-volatile memory 5 stores the printing collection information file 7, the process proceeds to step 3. When it is not the case, the process proceeds to step 4. In step 3, the job control unit 3 starts to perform the printing collection function for a proper start-up.

After the initialization process is completed properly, the printing device 1 waits for printing data from the upper device (not shown). While the printing device 1 waits for the printing data from the upper device, when the external interface unit 2 receives the printing data from the upper device, the printing data is sent to the control unit (not shown) controlling the device as a whole. The job control unit 3 receives data related to sheet consumption information, toner consumption information, drum consumption information, and staple consumption information from the control unit. Accordingly, a count value and information in the printing collection information file 7 are updated, respectively, thereby performing the printing collection as well as printing.

When the process proceeds from step 2 to step 4, the detachable non-volatile memory 5 is not attached to the printing device 1 despite that the printing device is in the printing collection mode. Accordingly, the device control unit 10 requests the panel control unit 6 to display the error information. As a result, the panel control unit 6 displays the error information indicating that the detachable non-volatile memory 5 is not attached to the printing device 1 as shown in FIG. 4. The device control unit 10 requests the control unit (not shown) controlling the printing device as a whole not to start the printing device 1.

In the first embodiment of the present invention, when the printing collection function is turned on, and the detachable non-volatile memory 5 is not attached to the printing device 1, the panel unit 8 displays the error message. Accordingly, the printing device does not start thereafter, thereby correctly performing the printing collection. When the charging process is conducted based on the printing collection, it is possible to correctly perform the charging process. Further, it is possible to notify that the detachable non-volatile memory 5, i.e., an option functional unit, is not attached to the printing device 1.

In this case, when a second tray is selected through the menu, the printing collection function control information 9 becomes second tray selection control information. Even though the second tray selection control information is turned on, when the device control unit 10 determines that the second tray is not attached, an error message is displayed. The option functional unit may include an interface card, a stacker, or a stapler.

When a user notices the error message, the user turns off the printing device 1 and attaches the detachable non-volatile memory 5 to the printing device 1. Then, the user turns on the printing device 1 to perform a normal mode. Alternatively, the user may press an on-line switch to select the normal mode without the detachable non-volatile memory 5 after acknowledging and ignoring the error message.

Figure 7:
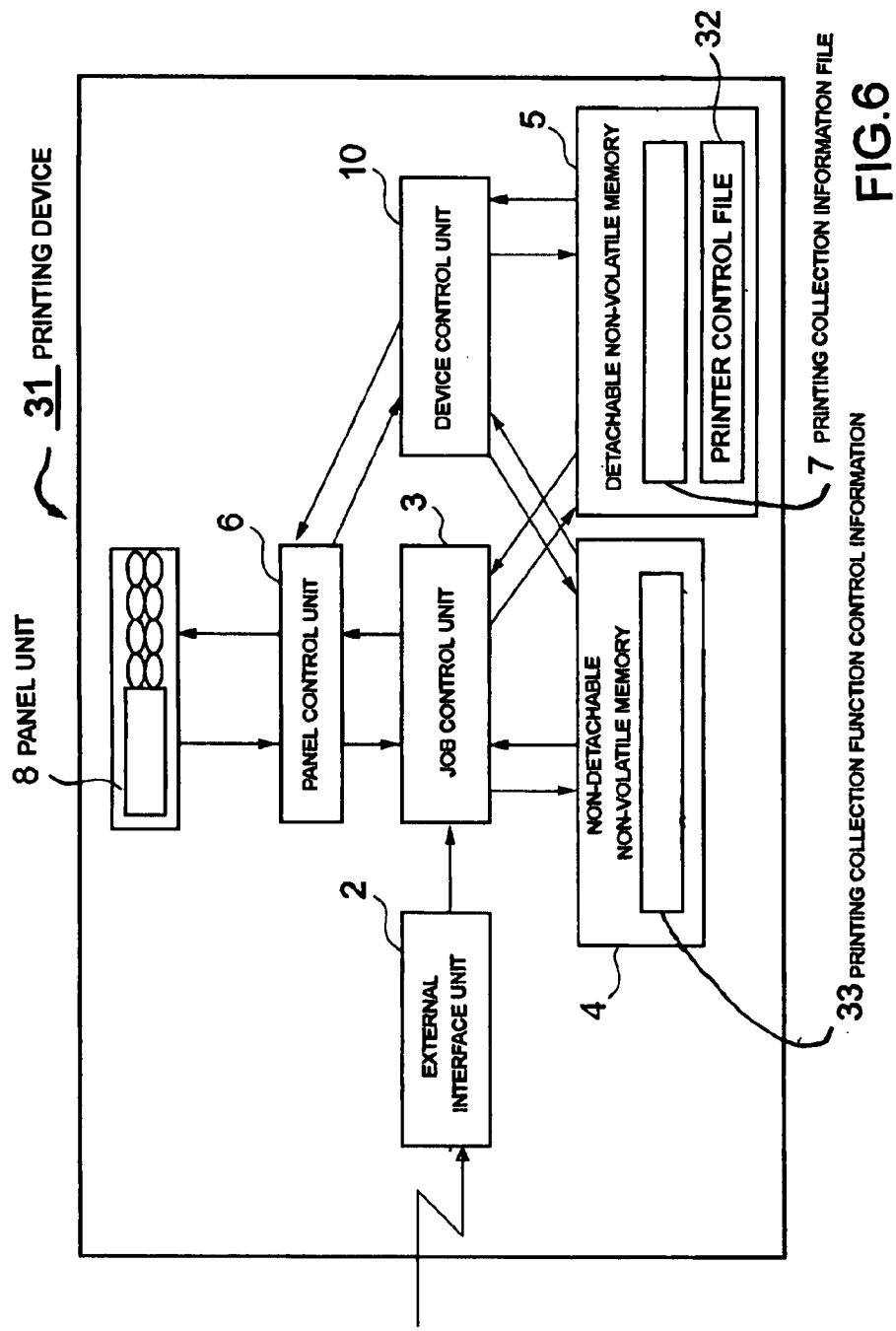
FIG. 7 is a schematic view showing a printer control file according to the second embodiment of the present invention.

A second embodiment of the present invention will be explained next. The same reference numerals denote similar components in the first embodiment, and explanation thereof is omitted. FIG. 6 is a block diagram showing a structure of a printing device according to the second embodiment of the present invention. FIG. 7 is a schematic view showing a printer control file according to the second embodiment of the present invention. FIG. 8 is a schematic view showing printing collection function control information according to the second embodiment of the present invention.

In a printing device 31 according to the second embodiment of the present invention, different from the first embodiment, the detachable non-volatile memory 5 is provided with a printer control file 32 as shown in FIG. 6. The printer control file 32 has a structure shown in FIG. 7, and stores a serial number same as that of the printing device 31, i.e., device identification information stored in a non-detachable non-volatile memory in each of printing devices. The printer control file 32 stores a different serial number according to a different printing device. Accordingly, it is possible to determine that the detachable non-volatile memory 5 stores the printing collection information of which printing device from a side of the device. That is, the serial number of the printing device 31 is compared with a serial number currently stored in the detachable non-volatile memory 5. Accordingly, it is possible to determine the detachable non-volatile memory 5 to be attached is actually attached to the printing device 31 from a side of the device.

Printing collection function control information 33 is stored in the non-detachable non-volatile memory 4, and has a structure shown in FIG. 8. The printing collection function control information 33 is formed of a status column for storing information indicating whether the printing collection function is turned on and a work device column for storing a storage device name of the printing collection information file. The status column stores "1" when the printing collection function is turned on, and stores "0" when the printing collection function is turned off. The work device column stores bit information and text indicating "Hard Disk" or "USB Memory Stick". Other structural features are the same as those in the first embodiment, and explanations thereof are omitted.

A process of initializing the printing collection function of the printing device 31 will be explained next with reference to FIGS. 6 to 8 as well as a flow chart shown in FIG. 9. FIG. 9 is a flow chart showing the process of initializing the printing collection function according to the second embodiment of the present invention.

The process of initializing the printing collection function starts when an operator turns on the collection function through the menu function on the display unit 8, or the external interface unit 2 receives the collection function turn-on command from the upper device (not shown). In step 11, the job control unit 3 turns "on" the status of the printing collection function control information 33 in the non-detachable non-volatile memory 4. The job control unit 3 also creates the printing collection information file 7 and the printing control file 32 in the detachable non-volatile memory 5.

In step 12, the job control unit 3 stores a storage device name of the detachable non-volatile memory 5 storing the printing collection information file 7 in the work device column of the printing collection function control information 33.

In step 13, the job control unit 3 stores a serial number stored in the non-detachable non-volatile memory of the printing device in the printing control file 32 in the detachable non-volatile memory 5. Accordingly, the process of initializing the printing collection function is completed.

Figure 10:
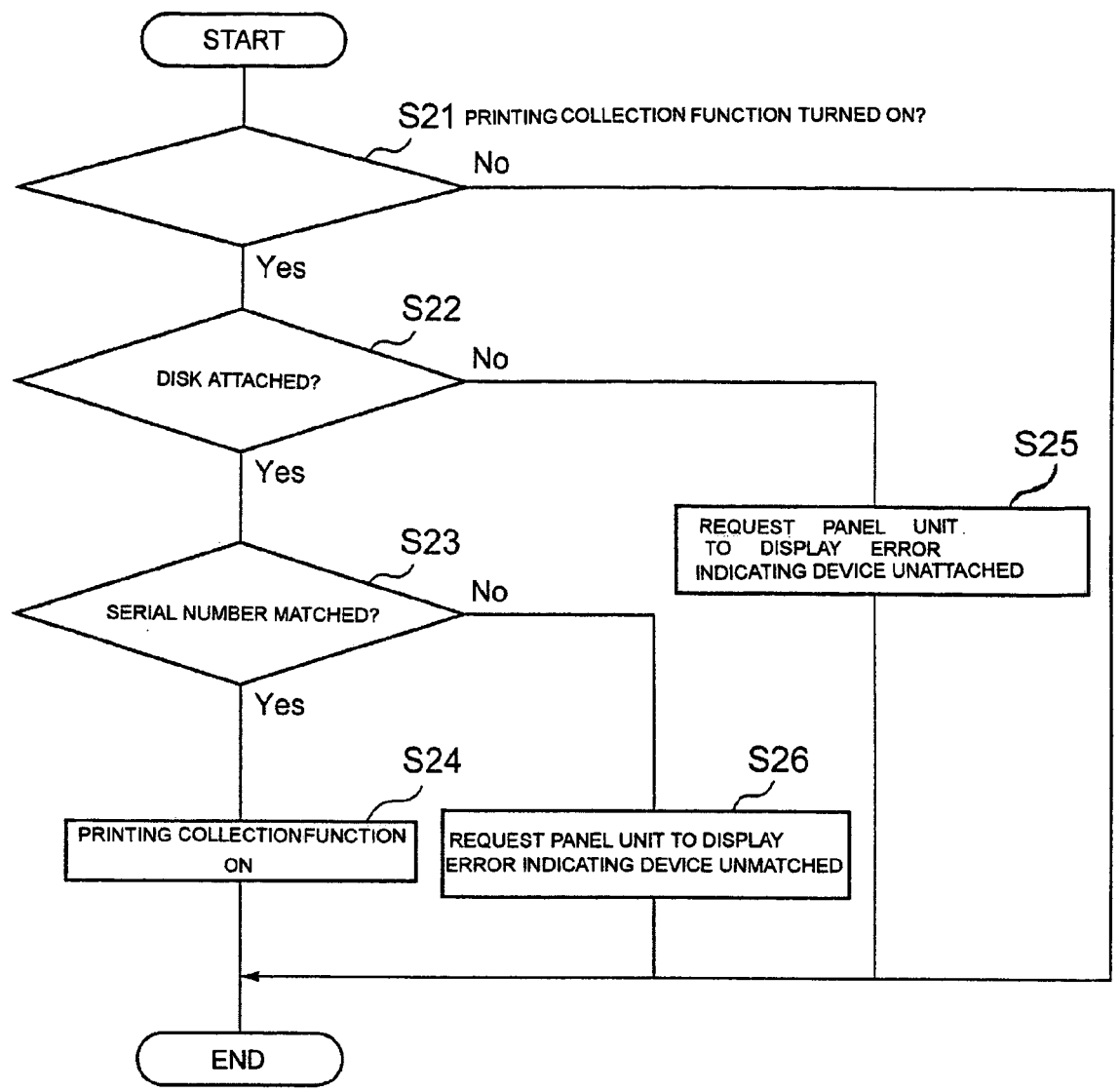
FIG. 10 is a flow chart showing a process of initializing a device control unit according to the second embodiment of the present invention.

The process of initializing the printing collection function starts after the printing device 31 is turned on. That is, when it is determined that the printing collection function is turned on while the detachable non-volatile memory 5 is not attached, or a detachable non-volatile memory not corresponding to the printing device 31 is attached, an error is displayed to set a mode of not starting the printing device 31. For this purpose, the device control unit 10 is initialized. A process of initializing the device control unit 10 will be explained with reference to FIGS. 6 to 8, and 11 as well as a flow chart shown in FIG. 10. FIG. 10 is a flow chart showing the process of initializing the device control unit according to the second embodiment of the present invention. FIG. 11 is a schematic view showing a panel unit according to the second embodiment of the present invention.

In step S21, the device control unit 10 refers the printing collection function control information 33 in the non-detachable non-volatile memory 4 to determine whether the printing collection function is turned on. When the status is "1" indicating that the printing collection function is turned on, the process proceeds to step S22. When it is not the case ("0" indicating that the printing collection function is not turned on), the process stops.

In step S22, the device control unit 10 determines whether the detachable non-volatile memory 5 (hard disk) is attached, and whether the detachable non-volatile memory 5 stores the printing collection information file 7. The device control unit 10 receives a signal indicating whether the detachable non-volatile memory 5 (hard disk) is attached to the printing device 31, and whether the detachable non-volatile memory 5 stores the printing collection information file 7. Accordingly, the device control unit 10 can determine whether the detachable non-volatile memory 5 is attached to the printing device 31, or the detachable non-volatile memory 5 stores the printing collection information file 7.

In step 22, when the device control unit 10 determines that the detachable non-volatile memory 5 is attached, and the detachable non-volatile memory 5 stores the printing collection information file 7, the process proceeds to step 23. When it is not the case, the process proceeds to step 25.

In step 23, the device control unit 120 compares the serial number stored in the printer control file 32 with the serial number of the printing device 31 to determine the numbers are matched. When the numbers are matched, the process proceeds to step 24. When the numbers are not matched, the process proceeds to step 26. After the initialization process is completed properly, the printing device 31 waits for printing data from the upper device (not shown).

While the printing device 1 waits for the printing data from the upper device, when the external interface unit 2 receives the printing data from the upper device, the printing data is sent to the control unit (not shown) controlling the device as a whole. The job control unit 3 receives data related to sheet consumption information, toner consumption information, drum consumption information, and staple consumption information from the control unit. Accordingly, a count value and information in the printing collection information file 7 are updated, respectively, thereby performing the printing collection as well as printing.

When the process proceeds from step 22 to step 25, the detachable non-volatile memory 5 is not attached to the printing device 31. Accordingly, the device control unit 10 requests the panel control unit 6 to display the error information. As a result, the panel control unit 6 displays the error information on the panel unit 8 indicating that the detachable non-volatile memory 5 is not attached as shown in FIG. 4. The device control unit 10 requests the control unit (not shown) controlling the printing device 31 as a whole not to start up the printing device 31.

When the process proceeds from step 22 to step 26, the detachable non-volatile memory 5 to be attached to the printing device 31 is not attached. Accordingly, the device control unit 10 recognizes that the printing collection information file 7 in the attached non-volatile memory is a printing collection information file of other device. Accordingly, the device control unit 10 requests the panel control unit 6 to display the error information. As a result, as shown in FIG. 11, the panel control unit 6 displays the error information on the panel unit 8 indicating that the detachable non-volatile memory 5 to be attached to the printing device 1 is not attached. The device control unit 10 requests the control unit (not shown) controlling the printing device 31 as a whole not to start up the printing device 31.

Instead of the printer control file 32, a serial number is assigned to the detachable non-volatile memory 5 storing a printing collection information file in advance. The printing device 31 is provided with a non-detachable non-volatile memory storing a device control file as an identification information memory unit storing the serial number of the detachable non-volatile memory 5. In the process of initializing the printing collection function, the device control unit 10 stores a number same as the serial number of the detachable non-volatile memory 5 in a device control file in the printing device. The serial number of the detachable non-volatile memory 5 is compared with the serial number of the printing device as the identification information. It is determined whether the numbers are matched, so that the process can be modified similar to the second embodiment according to the result.

In the second embodiment of the present invention, in addition to an effect of the first embodiment, when a memory different from the detachable non-volatile memory 5 to be attached to the printing device 31 is attached to the printing device 31, the error message is displayed on the panel unit 8. Also, it is possible to stop the printing device 31, thereby performing the printing collection correctly. When a charging operation is performed based on the printing collection, it is possible to accurately perform the charging operation.

The present invention is not limited to the embodiments described above. Various modifications are possible within the scope of the present invention.

The disclosure of Japanese Patent Application No. 2004-040209, filed on Feb. 17, 2004, is incorporated in the application.

While the invention has been explained with reference to the specific embodiments of the invention, the explanation is illustrative and the invention is limited only by the appended claims.

What is claimed is:

1. A printing device, comprising:
a function adding unit arranged to be detachable,
a display unit for displaying error information of the printing device,
a non-volatile memory for storing device information when said attached function adding unit is selected;
a detection unit for detecting whether the function adding unit is attached when said printing device is turned on, and
a control unit electrically connected to the display unit and the detection unit for requesting the display unit to display the error information when the function adding unit is not attached and said device information is stored in said non-volatile memory.

2. A printing device according to claim 1, wherein said function adding unit includes a memory unit for storing device information.

3. A printing device according to claim 2, further comprising a judging unit for judging whether identification information of said printing device to which the memory unit is to be attached stored in the memory unit matches to identification information of the printing device after the detection unit detects that the memory unit is attached.

4. A printing device according to claim 3, wherein said identification information is a specific number assigned to the printing device.

5. A printing device according to claim 3, wherein said identification information is a specific number assigned to the memory unit.

6. A printing device according to claim 1, wherein said function adding unit includes an option functional unit for adding a function to the printing device.

7. A printing device according to claim 1, wherein said detection unit detects whether the function adding unit is attached when there is information indicating that the function adding unit is attached.

8. A printing device according to claim 1, wherein said device control unit does not start printing when the device control unit requests the display unit to display the error information.

9. A printing device according to claim 1, wherein said device information is charging information.

10. A printing device according to claim 1, wherein said device information is consumption information of a supply.

11. A printing device according to claim 10, wherein said supply is a developing material.

12. A printing device according to claim 10, wherein said supply is a developing unit.

13. A printing device comprising:
a function adding unit arranged to be detachable and including a memory unit for storing device information,
a display unit for displaying error information of the printing device,
a detection unit for detecting whether the function adding unit is attached, and
a control unit electrically connected to the display unit and the detection unit for requesting the display unit to display the error information when the function adding unit is not attached, wherein said detection unit detects whether the function adding unit is attached when there is information indicating that a mode is set for storing the device information.

14. A printing device according to claim 13, wherein said mode is set through a command from an upper device.

15. A printing device according to claim 13, wherein said mode is set through an operation unit.

* * * * *